US010606402B2

(12) United States Patent
Kim et al.

(10) Patent No.: US 10,606,402 B2
(45) Date of Patent: *Mar. 31, 2020

(54) SMARTPHONE

(71) Applicant: HiDeep Inc., Gyeonggi-do (KR)

(72) Inventors: Seyeob Kim, Gyeonggi-do (KR);
Bonkee Kim, Gyeonggi-do (KR);
Sangsic Yoon, Gyeonggi-do (KR);
Young ho Cho, Gyeonggi-do (KR)

(73) Assignee: HIDEEP INC. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/257,222

(22) Filed: Jan. 25, 2019

(65) Prior Publication Data

US 2019/0171332 A1 Jun. 6, 2019

Related U.S. Application Data

(63) Continuation of application No. 15/296,392, filed on Oct. 18, 2016, now Pat. No. 10,234,984, which is a (Continued)

(30) Foreign Application Priority Data

Jul. 27, 2015 (KR) .................. 10-2015-0105690

(51) Int. Cl.
G06F 3/041 (2006.01)
G06F 3/044 (2006.01)
(Continued)

(52) U.S. Cl.
CPC ........ G06F 3/0416 (2013.01); G02F 1/13338 (2013.01); G02F 1/13439 (2013.01);
(Continued)

(58) Field of Classification Search
CPC ......... G06F 3/0416; G06F 2203/04102; G06F 3/0412; G06F 3/0414; G06F 3/044;
(Continued)

(56) References Cited

U.S. PATENT DOCUMENTS 9,201,105 B2 12/2015 Iida et al.
2003/0007238 A1 1/2003 Liang et al.
(Continued)

FOREIGN PATENT DOCUMENTS

CN 103257779 8/2013
CN 203386194 1/2014
(Continued)

OTHER PUBLICATIONS

International Search Report for Corresponding Application No. PCT/KR2014/006907, dated Nov. 28, 2014.
(Continued)

Primary Examiner — Aneeta Yodichkas
(74) Attorney, Agent, or Firm — The Belles Group, P.C.

(57) ABSTRACT

A smartphone may include a first cover layer and an LCD panel located under the first cover layer. The smartphone may include a backlight unit which may be located under the LCD panel. The smartphone may include a touch sensor which may sense touch in a capacitive manner. The backlight unit may include a pressure sensor and a spacer layer. The pressure sensor may include one or more electrodes formed in a single layer attached on the second cover layer and spaced apart from the reflective sheet. A driving signal may be applied to the touch sensor. A touch position may be detected by a sensing signal which may be output from the touch sensor. A magnitude of a touch pressure may be detected based on a change amount of capacitance which may be output from the pressure sensor.

15 Claims, 8 Drawing Sheets

Related U.S. Application Data continuation of application No. 14/820,942, filed on Aug. 7, 2015, now Pat. No. 9,501,195.

(51) Int. Cl.
| | | |
|---|---|---|
| *G02F 1/1333* | (2006.01) | |
| *G02F 1/1335* | (2006.01) | |
| *G02F 1/1343* | (2006.01) | |
| *G02F 1/1339* | (2006.01) | |
| *G09G 3/36* | (2006.01) | |
| *H04B 1/3888* | (2015.01) | |

(52) U.S. Cl.
CPC .. *G02F 1/133528* (2013.01); *G02F 1/134336* (2013.01); *G06F 3/044* (2013.01); *G06F 3/0412* (2013.01); *G06F 3/0414* (2013.01); *G09G 3/3648* (2013.01); *H04B 1/3888* (2013.01); *G02F 1/13394* (2013.01); *G02F 1/133345* (2013.01); *G02F 2001/133302* (2013.01); *G02F 2201/121* (2013.01); *G06F 2203/04102* (2013.01); *G06F 2203/04103* (2013.01); *G06F 2203/04105* (2013.01); *G09G 2300/0426* (2013.01)

(58) Field of Classification Search
CPC . G06F 2203/04103; G06F 2203/04105; H04B 1/3888; G02F 1/13439; G02F 1/133528; G02F 1/134336; G02F 1/13338; G02F 1/133345; G02F 1/13394; G02F 2001/133302; G02F 2201/121; G09G 2300/0426; G09G 3/3648
See application file for complete search history.

(56) References Cited

U.S. PATENT DOCUMENTS

| | | |
|---|---|---|
| 2004/0227736 A1 | 11/2004 | Kamrath et al. |
| 2008/0062139 A1 | 3/2008 | Hotelling et al. |
| 2008/0202251 A1 | 8/2008 | Serban et al. |
| 2010/0024573 A1 | 2/2010 | Daverman et al. |
| 2010/0033354 A1 | 2/2010 | Ejlersen |
| 2010/0123672 A1 | 5/2010 | Kim et al. |
| 2010/0309030 A1 | 12/2010 | Huang et al. |
| 2010/0321609 A1 | 12/2010 | Qi et al. |
| 2011/0023631 A1 | 2/2011 | Sleeman |
| 2011/0037726 A1 | 2/2011 | Lee |
| 2011/0115738 A1 | 5/2011 | Suzuki et al. |
| 2011/0126900 A1 | 6/2011 | Inoue et al. |
| 2011/0157087 A1 | 6/2011 | Kanehira et al. |
| 2011/0175845 A1 | 7/2011 | Honda et al. |
| 2012/0038583 A1 | 2/2012 | Westhues et al. |
| 2012/0050195 A1 | 3/2012 | Heo et al. |
| 2012/0068965 A1 | 3/2012 | Wada et al. |
| 2012/0105340 A1 | 5/2012 | Beom et al. |
| 2012/0113361 A1 | 5/2012 | Huang et al. |
| 2012/0127095 A1 | 5/2012 | Jun |
| 2012/0180575 A1 | 7/2012 | Sakano et al. |
| 2013/0016059 A1 | 1/2013 | Lowles et al. |
| 2013/0033450 A1 | 2/2013 | Coulson et al. |
| 2013/0234734 A1 | 9/2013 | Iida et al. |
| 2013/0257784 A1 | 10/2013 | Vandermeijden et al. |
| 2014/0049506 A1 | 2/2014 | Lin |
| 2014/0062934 A1 | 3/2014 | Coulson et al. |
| 2014/0078080 A1 | 3/2014 | Kim et al. |
| 2014/0204049 A1 | 7/2014 | Tsai et al. |
| 2014/0210791 A1 | 7/2014 | Hanauer et al. |
| 2014/0333852 A1 | 11/2014 | Ishikawa et al. |
| 2015/0169121 A1 | 6/2015 | Yao et al. |
| 2015/0212633 A1 | 7/2015 | Yamagishi et al. |
| 2015/0370373 A1 | 12/2015 | Barel |
| 2016/0034087 A1 | 2/2016 | Kim et al. |
| 2016/0035290 A1 | 2/2016 | Kim et al. |
| 2016/0062500 A1 | 3/2016 | Kessler et al. |
| 2016/0085336 A1 | 3/2016 | Kim et al. |
| 2016/0088133 A1 | 3/2016 | Kim et al. |

FOREIGN PATENT DOCUMENTS

| | | |
|---|---|---|
| CN | 104145240 A | 11/2014 |
| JP | 2007322587 | 12/2007 |
| JP | 2009163363 | 7/2009 |
| JP | 2010244514 | 10/2010 |
| JP | 2011081578 | 4/2011 |
| JP | 2011086191 | 4/2011 |
| JP | 2011258043 | 12/2011 |
| JP | 2012235224 | 11/2012 |
| JP | 2013088932 | 5/2013 |
| JP | 2013105154 | 5/2013 |
| JP | 2013242770 | 12/2013 |
| JP | 2014194591 | 10/2014 |
| JP | 5798700 | 10/2015 |
| KR | 200900776126 | 7/2009 |
| KR | 20100025176 | 3/2010 |
| KR | 20110039304 | 4/2011 |
| KR | 1033154 | 5/2011 |
| KR | 1020110128724 | 11/2011 |
| KR | 20120053716 | 5/2012 |
| KR | 20120139518 | 12/2012 |
| KR | 101311235 | 9/2013 |
| KR | 1020130127176 | 11/2013 |
| KR | 20130131647 | 12/2013 |
| KR | 1020140096905 | 8/2014 |
| KR | 20150011271 | 1/2015 |
| KR | 101506511 | 4/2015 |
| WO | WO2011013588 | 2/2011 |
| WO | WO2011111906 | 9/2011 |
| WO | WO2014017248 | 1/2014 |
| WO | WO2014080924 | 5/2014 |
| WO | 2014092758 | 6/2014 |
| WO | 2015047374 | 4/2015 |
| WO | WO2015106183 | 7/2015 |

OTHER PUBLICATIONS

Corresponding Search Report Issued by the EPO dated Aug. 27, 2015.
Corresponding Office Action Issued by the KIPO dated Oct. 19, 2015.
Corresponding Office Action Issued by the JPO dated Jul. 14, 2015.
Corresponding Office Action Issued by the KIPO dated Sep. 30, 2015.
Corresponding Office Action Issued by the JPO dated Jul. 28, 2015.
Corresponding Office Action Issued by the KIPO dated Sep. 23, 2015.
Corresponding Office Action Issued by JPO dated Aug. 25, 2015.
Corresponding U.S. Appl. No. 14/992,568, filed Jan. 11, 2016.
Corresponding U.S. Appl. No. 15/007,240, filed Jan. 27, 2016.
Corresponding U.S. Appl. No. 15/009,951, filed Jan. 29, 2016.
Corresponding U.S. Appl. No. 14/992,668, filed Jan. 11, 2016.
Corresponding U.S. Appl. No. 15/007,245, filed Jan. 27, 2016.
Corresponding U.S. Appl. No. 15/009,973, filed Jan. 29, 2016.
Corresponding U.S. Appl. No. 14/820,942, filed Aug. 7, 2015.
Corresponding U.S. Appl. No. 14/908,706, filed Jan. 29, 2016.
Corresponding U.S. Appl. No. 15/071,561, filed Mar. 16, 2016.
Second Office Action issued in Corresponding CN Application No. 201510994368, dated Jun. 4, 2018. CN.
Extended Search Report for Corresponding EP Application No. 15192827.2, dated Jan. 29, 2016. EP.

SMARTPHONE

CROSS REFERENCE TO RELATED APPLICATIONS

The present application is a continuation of U.S. patent application Ser. No. 15/296,392, filed Oct. 18, 2016, which is a continuation of U.S. patent application Ser. No. 14/820, 942 (now U.S. Pat. No. 9,501,195), filed Aug. 7, 2015, which claims priority under 35 U.S.C. § 119 to Korean Patent Application No. 10-2015-0105690, filed Jul. 27, 2015. The disclosures of these references are incorporated herein by reference in their entireties.

FIELD OF THE INVENTION

This disclosure relates to a smartphone, and more particularly to a smartphone configured to detect a touch position and/or touch pressure in a display module.

BACKGROUND OF THE INVENTION

Various kinds of input devices are being used to operate a computing system. For example, the input device includes a button, key, joystick and touch screen. Since the touch screen is easy and simple to operate, the touch screen is increasingly being used in operation of the computing system.

The touch screen may constitute a touch surface of a touch input device including a touch sensor panel which may be a transparent panel including a touch-sensitive surface. The touch sensor panel is attached to the front side of a display screen, and then the touch-sensitive surface may cover the visible side of the display screen. The touch screen allows a user to operate the computing system by simply touching the touch screen by a finger, etc. Generally, the computing system recognizes the touch and the touch position on the touch screen and analyzes the touch, and thus, performs the operations in accordance with the analysis.

Here, there is a demand for a touch input device capable of detecting not only the touch position according to the touch on the touch screen but the magnitude of the touch pressure without degrading the performance of the display module.

SUMMARY OF THE INVENTION

In one embodiment, the present disclosure is directed to a smartphone including a first cover layer; an LCD panel located under the first cover layer and comprising a liquid crystal layer, a first glass layer, and a second glass layer, the liquid crystal layer located between the first glass layer and the second glass layer; a backlight unit located under the LCD panel and comprising an optical film, a light source, a reflective sheet, and a second cover layer; and a touch sensor which senses touch in a capacitive manner; wherein the backlight unit further comprises a pressure sensor and a spacer layer, the pressure sensor comprising a plurality of electrodes formed in a single layer attached on the second cover layer and spaced apart from the reflective sheet, the pressure sensor located between the reflective sheet and the second cover layer; wherein a driving signal is applied to the touch sensor and a touch position is detected by a sensing signal output from the touch sensor; wherein a magnitude of a touch pressure is detected based on a change amount of capacitance that is output from the pressure sensor and that is changed according to a distance between the pressure sensor and an electrode located within the LCD panel; wherein the LCD panel is bent according to the touch; and wherein the change amount of the capacitance output from the pressure sensor changes as the LCD panel bends.

BRIEF DESCRIPTION OF THE DRAWINGS

FIG. 5b shows a case where a pressure has been applied in the structure of FIG. 5a;

DETAILED DESCRIPTION OF THE INVENTION

Figure 1:
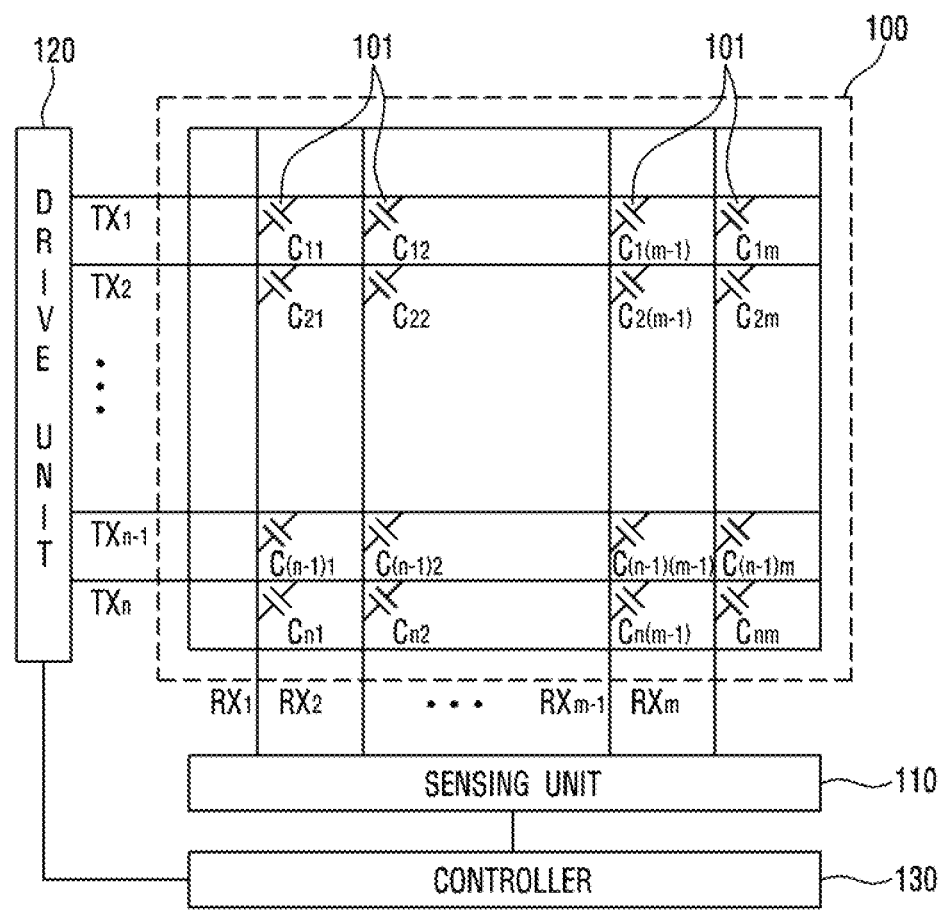
FIG. 1 is a schematic view of a configuration of a capacitance type touch sensor panel and the operation thereof in accordance with an embodiment of the present invention.

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. For example, a specific shape, structure and properties, which are described in this disclosure, may be implemented in other embodiments without departing from the spirit and scope of the present invention with respect to one embodiment. Also, it should be noted that positions or placements of individual components within each disclosed embodiment may be changed without departing from the spirit and scope of the present invention. Therefore, the following detailed description is not intended to be limited. If adequately described, the scope of the present invention is limited only by the appended claims of the present invention as well as all equivalents thereto. Similar reference numerals in the drawings designate the same or similar functions in many aspects.

A touch input device according to an embodiment of the present invention will be described with reference to the accompanying drawings. While a capacitance type touch sensor panel 100 and a pressure sensor 450 and 460 are described below, another method according to the embodiment may be applied to detect a touch position and/or a touch pressure.

FIG. 1 is a schematic view of a configuration of the capacitance touch sensor panel 100 and the operation thereof in accordance with the embodiment of the present invention. Referring to FIG. 1, the touch sensor panel 100 according to the embodiment of the present invention may include a plurality of drive electrodes TX1 to TXn and a plurality of receiving electrodes RX1 to RXm, and may include a drive unit 120 which applies a driving signal to the plurality of drive electrodes TX1 to TXn for the purpose of the operation of the touch sensor panel 100, and a sensing unit 110 which detects whether the touch has occurred or not and/or the touch position by receiving a sensing signal including information on the capacitance change amount changing according to the touch on the touch surface of the touch sensor panel 100.

As shown in FIG. 1, the touch sensor panel 100 may include the plurality of drive electrodes TX1 to TXn and the plurality of receiving electrodes RX1 to RXm. While FIG. 1 shows that the plurality of drive electrodes TX1 to TXn and the plurality of receiving electrodes RX1 to RXm of the touch sensor panel 100 form an orthogonal array, the present invention is not limited to this. The plurality of drive electrodes TX1 to TXn and the plurality of receiving electrodes RX1 to RXm has an array of arbitrary dimension, for example, a diagonal array, a concentric array, a 3-dimensional random array, etc., and an array obtained by the application of them. Here, "n" and "m" are positive integers and may be the same as each other or may have different values. The magnitude of the value may be changed depending on the embodiment.

As shown in FIG. 1, the plurality of drive electrodes TX1 to TXn and the plurality of receiving electrodes RX1 to RXm may be arranged to cross each other. The drive electrode TX may include the plurality of drive electrodes TX1 to TXn extending in a first axial direction. The receiving electrode RX may include the plurality of receiving electrodes RX1 to RXm extending in a second axial direction crossing the first axial direction.

In the touch sensor panel 100 according to the embodiment of the present invention, the plurality of drive electrodes TX1 to TXn and the plurality of receiving electrodes RX1 to RXm may be formed in the same layer. For example, the plurality of drive electrodes TX1 to TXn and the plurality of receiving electrodes RX1 to RXm may be formed on the same side of an insulation layer (not shown). Also, the plurality of drive electrodes TX1 to TXn and the plurality of receiving electrodes RX1 to RXm may be formed in the different layers. For example, the plurality of drive electrodes TX1 to TXn and the plurality of receiving electrodes RX1 to RXm may be formed on both sides of one insulation layer (not shown) respectively, or the plurality of drive electrodes TX1 to TXn may be formed on a side of a first insulation layer (not shown) and the plurality of receiving electrodes RX1 to RXm may be formed on a side of a second insulation layer (not shown) different from the first insulation layer.

The plurality of drive electrodes TX1 to TXn and the plurality of receiving electrodes RX1 to RXm may be made of a transparent conductive material (for example, indium tin oxide (ITO) or antimony tin oxide (ATO) which is made of tin oxide ($SnO_2$), and indium oxide ($In_2O_3$), etc.), or the like. However, this is only an example. The drive electrode TX and the receiving electrode RX may be also made of another transparent conductive material or an opaque conductive material. For instance, the drive electrode TX and the receiving electrode RX may be formed to include at least any one of silver ink, copper or carbon nanotube (CNT). Also, the drive electrode TX and the receiving electrode RX may be made of metal mesh or nano silver.

The drive unit 120 according to the embodiment of the present invention may apply a driving signal to the drive electrodes TX1 to TXn. In the embodiment of the present invention, one driving signal may be sequentially applied at a time to the first drive electrode TX1 to the n-th drive electrode TXn. The driving signal may be applied again repeatedly. This is only an example. The driving signal may be applied to the plurality of drive electrodes at the same time in accordance with the embodiment.

Through the receiving electrodes RX1 to RXm, the sensing unit 110 receives the sensing signal including information on a capacitance (Cm) 101 generated between the receiving electrodes RX1 to RXm and the drive electrodes TX1 to TXn to which the driving signal has been applied, thereby detecting whether or not the touch has occurred and where the touch has occurred. For example, the sensing signal may be a signal coupled by the capacitance (CM) 101 generated between the receiving electrode RX and the drive electrode TX to which the driving signal has been applied. As such, the process of sensing the driving signal applied from the first drive electrode TX1 to the n-th drive electrode TXn through the receiving electrodes RX1 to RXm can be referred to as a process of scanning the touch sensor panel 100.

For example, the sensing unit 110 may include a receiver (not shown) which is connected to each of the receiving electrodes RX1 to RXm through a switch. The switch becomes the on-state in a time interval during which the signal of the corresponding receiving electrode RX is sensed, thereby allowing the receiver to sense the sensing signal from the receiving electrode RX. The receiver may include an amplifier (not shown) and a feedback capacitor coupled between the negative (−) input terminal of the amplifier and the output terminal of the amplifier, i.e., coupled to a feedback path. Here, the positive (+) input terminal of the amplifier may be connected to the ground or a reference voltage. Also, the receiver may further include a reset switch which is connected in parallel with the feedback capacitor. The reset switch may reset the conversion from current to voltage that is performed by the receiver. The negative input terminal of the amplifier is connected to the corresponding receiving electrode RX and receives and integrates a current signal including information on the capacitance (CM) 101, and then converts the integrated current signal into voltage. The sensing unit 110 may further include an analog to digital converter (ADC) (not shown) which converts the integrated data by the receiver into digital data. Later, the digital data may be input to a processor (not shown) and processed to obtain information on the touch on the touch sensor panel 100. The sensing unit 110 may include the ADC and processor as well as the receiver.

A controller 130 may perform a function of controlling the operations of the drive unit 120 and the sensing unit 110. For example, the controller 130 generates and transmits a drive control signal to the drive unit 120, so that the driving signal can be applied to a predetermined drive electrode TX1 at a predetermined time. Also, the controller 130 generates and transmits the drive control signal to the sensing unit 110, so that the sensing unit 110 may receive the sensing signal from the predetermined receiving electrode RX at a predetermined time and perform a predetermined function.

In FIG. 1, the drive unit 120 and the sensing unit 110 may constitute a touch detection device (not shown) capable of detecting whether the touch has occurred on the touch sensor panel 100 according to the embodiment of the present invention or not and/or where the touch has occurred. The touch detection device according to the embodiment of the present invention may further include the controller 130. The touch detection device according to the embodiment of the present invention may be integrated and implemented on a touch sensing integrated circuit (IC, not shown) in a touch input device 1000 including the touch sensor panel 100. The drive electrode TX and the receiving electrode RX included in the touch sensor panel 100 may be connected to the drive unit 120 and the sensing unit 110 included in the touch sensing IC through, for example, a conductive trace and/or a conductive pattern printed on a circuit board, or the like. The touch sensing IC may be located on a circuit board on which the conductive pattern has been printed. According to the embodiment, the touch sensing IC may be mounted on a main board for operation of the touch input device 1000.

As described above, a capacitance (C) with a predetermined value is generated at each crossing of the drive electrode TX and the receiving electrode RX. When an object like a finger approaches close to the touch sensor panel 100, the value of the capacitance may be changed. In FIG. 1, the capacitance may represent a mutual capacitance (Cm). The sensing unit 110 senses such electrical characteristics, thereby being able to sense whether the touch has occurred on the touch sensor panel 100 or not and where the touch has occurred. For example, the sensing unit 110 is able to sense whether the touch has occurred on the surface of the touch sensor panel 100 comprised of a two-dimensional plane consisting of a first axis and a second axis.

More specifically, when the touch occurs on the touch sensor panel 100, the drive electrode TX to which the driving signal has been applied is detected, so that the position of the second axial direction of the touch can be detected. Likewise, when the touch occurs on the touch sensor panel 100, the capacitance change is detected from the reception signal received through the receiving electrode RX, so that the position of the first axial direction of the touch can be detected.

The mutual capacitance type touch sensor panel as the touch sensor panel 100 has been described in detail in the foregoing. However, in the touch input device 1000 according to the embodiment of the present invention, the touch sensor panel 100 for detecting whether or not the touch has occurred and where the touch has occurred may be implemented by using not only the above-described method but also any touch sensing method like a self-capacitance type method, a surface capacitance type method, a projected capacitance type method, a resistance film method, a surface acoustic wave (SAW) method, an infrared method, an optical imaging method, a dispersive signal technology, and an acoustic pulse recognition method, etc.

Here, the configuration including the drive electrode TX and the receiving electrode RX for detecting whether or not the touch has occurred and/or the touch position can be referred to as a touch sensor.

The touch sensor panel 100 for detecting where the touch has occurred in the touch input device 1000 according to the embodiment of the present invention may be positioned outside or inside a display panel 200.

The display panel 200 of the touch input device 1000 according to the embodiment of the present invention may be a display panel included in a liquid crystal display (LCD), a plasma display panel (PDP), an organic light emitting diode (OLED), etc. Accordingly, a user may perform the input operation by touching the touch surface while visually identifying an image displayed on the display panel. Here, the display panel 200 may include a control circuit which receives an input from an application processor (AP) or a central processing unit (CPU) on a main board for the operation of the touch input device 1000 and displays the contents that the user wants on the display panel. Here, the control circuit for the operation of the display panel 200 may include a display panel control IC, a graphic controller IC, and a circuit required to operate other display panels 200.

FIGS. 2a to 2e are conceptual views showing a relative position of the touch sensor panel 100 with respect to a display panel 200 in the touch input device according to the embodiment of the present invention.

First, a relative position of the touch sensor panel 100 with respect to the display panel 200 using an LCD panel will be described with reference to FIGS. 2a to 2c.

Figure 2A:
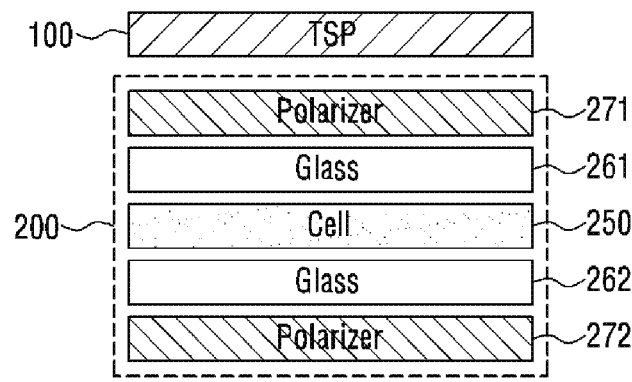
FIGS. 2a to 2e are conceptual views showing a relative position of the touch sensor panel with respect to a display panel in a touch input device according to the embodiment of the present invention.
Figure 2B:
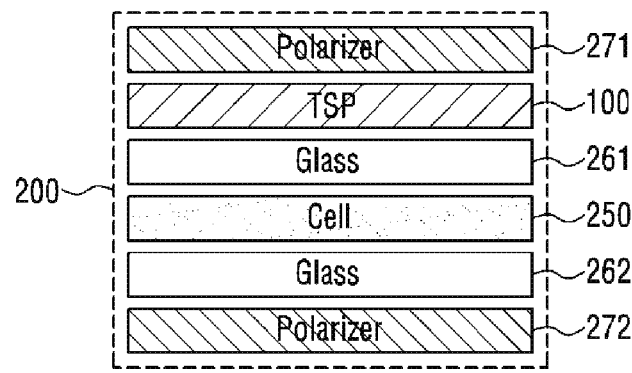
Figure 2C:
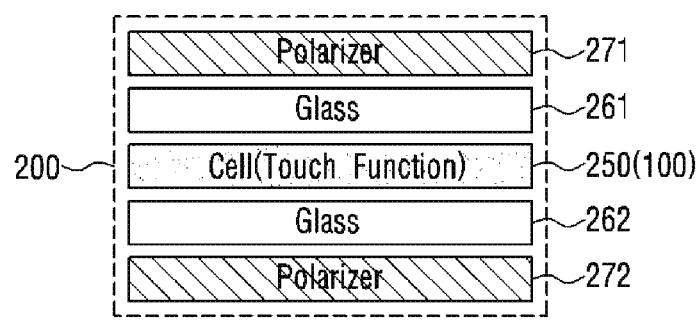

As shown in FIGS. 2a to 2c, the LCD panel may include a liquid crystal layer 250 including a liquid crystal cell, a first glass layer 261 and a second glass layer 262 which are disposed on both sides of the liquid crystal layer 250 and include electrodes, a first polarizer layer 271 formed on a side of the first glass layer 261 in a direction facing the liquid crystal layer 250, and a second polarizer layer 272 formed on a side of the second glass layer 262 in the direction facing the liquid crystal layer 250. Here, the first glass layer 261 may be a color filter glass, and the second glass layer 262 may be a TFT glass.

It is clear to those skilled in the art that the LCD panel may further include other configurations for the purpose of performing the displaying function and may be transformed.

FIG. 2a shows that the touch sensor panel 100 of the touch input device 1000 is disposed outside the display panel 200. The touch surface of the touch input device 1000 may be the surface of the touch sensor panel 100. In FIG. 2a, the top surface of the touch sensor panel 100 is able to function as the touch surface. Also, according to the embodiment, the touch surface of the touch input device 1000 may be the outer surface of the display panel 200. In FIG. 2a, the bottom surface of the second polarizer layer 272 of the display panel 200 is able to function as the touch surface. Here, in order to protect the display panel 200, the bottom surface of the display panel 200 may be covered with a cover layer (not shown) like glass.

FIGS. 2b and 2c show that the touch sensor panel 100 of the touch input device 1000 is disposed inside the display panel 200. Here, in FIG. 2b, the touch sensor panel 100 for detecting the touch position is disposed between the first glass layer 261 and the first polarizer layer 271. Here, the touch surface of the touch input device 1000 is the outer surface of the display panel 200. The top surface or bottom surface of the display panel 200 in FIG. 2b may be the touch surface. FIG. 2c shows that the touch sensor panel 100 for detecting the touch position is included in the liquid crystal layer 250. Here, the touch surface of the touch input device 1000 is the outer surface of the display panel 200. The top surface or bottom surface of the display panel 200 in FIG. 2c may be the touch surface. In FIGS. 2b and 2c, the top surface or bottom surface of the display panel 200, which can be the touch surface, may be covered with a cover layer (not shown) like glass.

Figure 2D:
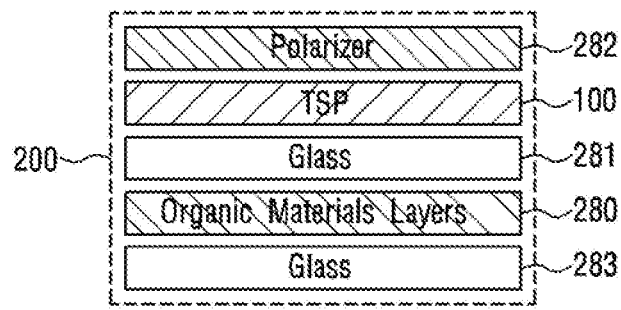
Figure 2E:
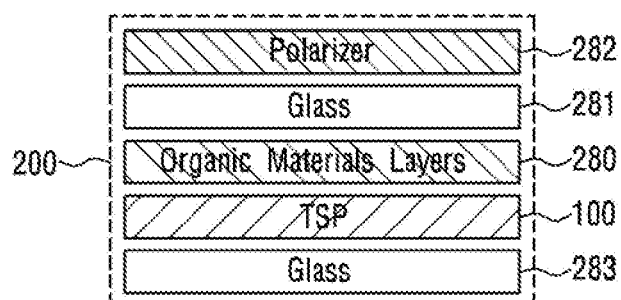

Next, a relative position of the touch sensor panel 100 with respect to the display panel 200 using an OLED panel will be described with reference to FIGS. 2d and 2e. In FIG. 2d, the touch sensor panel 100 is located between a polarizer layer 282 and a first glass layer 281. In FIG. 2e, the touch sensor panel 100 is located between an organic layer 280 and a second glass layer 283.

Here, the first glass layer 281 may be comprised of an encapsulation glass, and the second glass layer 283 may be comprised of a TFT glass. Since the touch sensing has been described above, only the other configurations thereof will be briefly described.

The OLED panel is a self-light emitting display panel which uses a principle in which current flows through a fluorescent or phosphorescent organic thin film and then electrons and electron holes are combined in the organic layer, so that light is generated. The organic matter constituting the light emitting layer determines the color of the light.

Specifically, the OLED uses a principle in which when electricity flows and an organic matter is applied on glass or plastic, the organic matter emits light. That is, the principle is that electron holes and electrons are injected into the anode and cathode of the organic matter respectively and are recombined in the light emitting layer, so that a high energy exciton is generated and the exciton releases the energy while falling down to a low energy state and then light with a particular wavelength is generated. Here, the color of the light is changed according to the organic matter of the light emitting layer.

The OLED includes a line-driven passive-matrix organic light-emitting diode (PM-OLED) and an individual driven active-matrix organic light-emitting diode (AM-OLED) in accordance with the operating characteristics of a pixel constituting a pixel matrix. None of them require a backlight. Therefore, the OLED enables a very thin display panel to be implemented, has a constant contrast ratio according to an angle and obtains a good color reproductivity depending on a temperature. Also, it is very economical in that non-driven pixel does not consume power.

In terms of operation, the PM-OLED emits light only during a scanning time at a high current, and the AM-OLED maintains a light emitting state only during a frame time at a low current. Therefore, the AM-OLED has a resolution higher than that of the PM-OLED and is advantageous for driving a large area display panel and consumes low power. Also, a thin film transistor (TFT) is embedded in the AM-OLED, and thus, each component can be individually controlled, so that it is easy to implement a delicate screen.

As shown in FIGS. 2d and 2e, basically, the OLED (particularly, AM-OLED) panel includes the polarizer layer 282, the first glass layer 281, the organic layer 280, and the second glass layer 283. Here, the first glass layer 281 may be a cover glass and the second glass layer 283 may be a TFT glass. However, they are not limited to this.

Also, the organic layer 280 may include a hole injection layer (HIL), a hole transport layer (HTL), an electron injection layer (EIL), an electron transport layer (ETL), and a light-emitting layer (EML).

Briefly describing each of the layers, HIL injects electron holes and uses a material such as CuPc, etc. HTL functions to move the injected electron holes and mainly uses a material having a good hole mobility. Arylamine, TPD, and the like may be used as the HTL. The EIL and ETL inject and transport electrons. The injected electrons and electron holes are combined in the EML and emit light. The EML represents the color of the emitted light and is composed of a host determining the lifespan of the organic matter and an impurity (dopant) determining the color sense and efficiency. This just describes the basic structure of the organic layer 280 include in the OLED panel. The present invention is not limited to the layer structure or material, etc., of the organic layer 280.

The organic layer 280 is inserted between the anode (not shown) and a cathode (not shown). When the TFT becomes an on-state, a driving current is applied to the anode and the electron holes are injected, and the electrons are injected to the cathode. Then, the electron holes and electrons move to the organic layer 280 and emit the light.

Also, according to the embodiment, at least a portion of the touch sensor may be configured to be positioned within the display panel 200, and at least a portion of the remaining touch sensor may be configured to be positioned outside the display panel 200. For example, any one of the drive electrode TX and the receiving electrode RX which constitute the touch sensor panel 100 may be configured to be positioned outside the display panel 200, the remaining electrode may be configured to be positioned within the display panel 200. When the touch sensor is disposed within the display panel 200, an electrode for operating the touch sensor may be further disposed. However, various configurations and/or the electrode which are located within the display panel 200 may be used as the touch sensor for touch sensing.

The second glass layer 262 may be comprised of various layers including a data line a gate line, TFT, a common electrode, and a pixel electrode, etc. These electrical components may operate in such a manner as to generate a controlled electric field and orient liquid crystals located in the liquid crystal layer 250. Any one of the data line, gate line, common electrode, and pixel electrode included in the second glass layer 262 may be configured to be used as the touch sensor.

Up to now, the touch position detection by the touch sensor panel 100 according to the embodiment of the present invention has been described. Additionally, through use of the touch sensor panel 100 according to the embodiment of the present invention, it is possible to detect the magnitude of the touch pressure as well as whether the touch has occurred or not and/or where the touch has occurred. Also, a pressure sensor for detecting the touch pressure is included separately from the touch sensor panel 100, so that it is possible to detect the magnitude of the touch pressure. Hereafter, the pressure sensor and the touch input device including the same will be described in detail.

Figure 3:
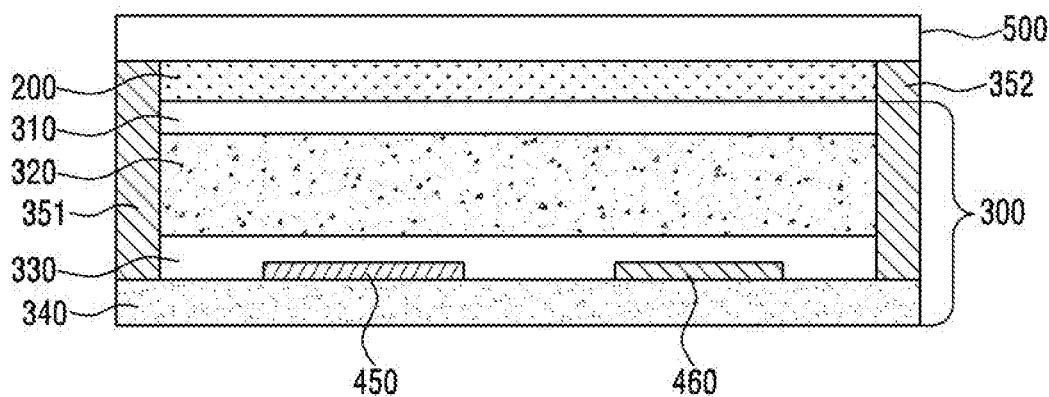
FIG. 3 is a cross sectional view of the touch input device configured to detect the touch position and touch pressure in accordance with the embodiment of the present invention.

FIG. 3 is a cross sectional view of the touch input device configured to detect the touch position and touch pressure in accordance with the embodiment of the present invention. As shown in FIG. 3, the touch input device 1000 according to the embodiment of the present invention may include the display panel 200, a backlight unit 300 disposed under the display panel 200, and a cover layer 500 disposed on the display panel 200. In the touch input device 1000 according to the embodiment of the present invention, the pressure sensor 450 and 460 may be formed on a cover 340. In this specification, the display panel 200 and the backlight unit 300 may be collectively referred to as a display module. In this specification, though it is shown that the pressure sensor 450 and 460 are attached on the cover 340, the pressure sensor 450 and 460 can be attached to a configuration which is included in the touch input device 1000 and performs the same and/or similar function as/to that of the cover 340 in accordance with the embodiment.

The touch input device 1000 according to the embodiment of the present invention may include an electronic device including the touch screen, for example, a cell phone, a personal data assistant (PDA), a smart phone, a tablet personal computer, an MP3 player, a laptop computer, etc.

In the touch input device 1000 according to the embodiment of the present invention, at least a portion of the touch sensor may be included within the display panel 200. Also, the drive electrode and the receiving electrodes for touch sensing may be included within the display panel 200 in accordance with the embodiment.

The cover layer 500 according to the embodiment of the present invention may be comprised of a cover glass which protects the front surface of the display panel 200 and forms the touch surface. As shown in FIG. 3, the cover layer 500 may be formed wider than the display panel 200.

Since the display panel 200 such as the LCD panel according to the embodiment of the present invention performs a function of only blocking or transmitting the light without emitting light by itself, the backlight unit 300 may be required. For example, the backlight unit 300 is disposed under the display panel 200, includes a light source and throws the light on the display panel 200, so that not only brightness and darkness but also information having a variety of colors is displayed on the screen. Since the display panel 200 is a passive device, it is not self-luminous. Therefore, the rear side of the display panel 200 requires a light source having a uniform luminance distribution.

The backlight unit 300 according to the embodiment of the present invention may include an optical layer 320 for illuminating the display panel 200. The optical layer 320 will be described in detail with reference to FIG. 4.

The backlight unit 300 according to the embodiment of the present invention may include the cover 340. The cover 340 may be made of a metallic material. When a pressure is applied from the outside through the cover layer 500 of the touch input device 1000, the cover layer 500 and the display panel 200 may be bent. Here, the bending causes a distance between the pressure sensor 450 and 460 and a reference potential layer located within the display module to be changed. The capacitance change caused by the distance change is detected through the pressure sensor 450 and 460, so that the magnitude of the pressure can be detected. Here, a pressure is applied to the cover layer 500 in order to precisely detect the magnitude of the pressure, the position of the pressure sensor 450 and 460 needs to be fixed without changing. Therefore, the cover 340 is able to perform a function of a support part capable of fixing a pressure sensor without being bent even by the application of pressure. According to the embodiment, the cover 340 is manufactured separately from the backlight unit 300, and may be assembled together when the display module is manufactured.

In the touch input device 1000 according to the embodiment of the present invention, a first air gap 310 may be included between the display panel 200 and the backlight unit 300. This intends to protect the display panel 200 and/or the backlight unit 300 from an external impact. This first air gap 310 may be configured to be included in the backlight unit 300.

The optical layer 320 and the cover 340, which are included in the backlight unit 300, may be configured to be spaced apart from each other. A second air gap 330 may be provided between the optical layer 320 and the cover 340. The second air gap 330 may be required in order to ensure that the pressure sensor 450 and 460 disposed on the cover 340 does not contact with the optical layer 320, and in order to prevent that the optical layer 320 contacts with the pressure sensor 450 and 460, and thus, deteriorates the performance of the optical layer 320 even though an external pressure is applied to the cover layer 500 and the optical layer 320, the display panel 200, and the cover layer 500 are bent.

The touch input device 1000 according to the embodiment of the present invention may further include a support part 351 and 352 such that the display panel 200, the backlight unit 300, and the cover layer 500 are coupled to maintain a fixed shape. According to the embodiment, the cover 340 may be integrally formed with the support part 351 and 352. According to the embodiment, the support part 351 and 352 may form a portion of the backlight unit 300.

The structure and function of the LCD panel 200 and the backlight unit 300 is a publicly known art and will be briefly described below. The backlight unit 300 may include several optical parts.

Figure 4:
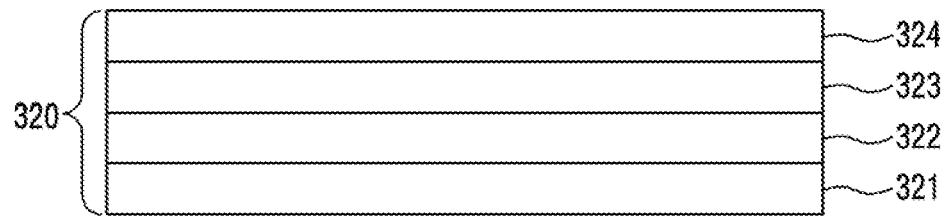
FIG. 4 shows an optical layer of a backlight unit in the touch input device according to the embodiment of the present invention.

FIG. 4 shows the optical layer 320 of the backlight unit 300 in the touch input device according to the embodiment of the present invention. FIG. 4 shows the optical layer 320 when the LCD panel is used as the display panel 200.

In FIG. 4, the optical layer 320 of the backlight unit 300 may include a reflective sheet 321, a light guide plate 322, a diffuser sheet 323, and a prism sheet 324. Here, the backlight unit 300 may include a light source (not shown) which is formed in the form of a linear light source or a point light source, etc., and is disposed on the rear and/or side of the light guide plate 322.

The light guide plate 322 may generally convert lights from the light source (not shown) in the form of a linear light source or point light source into light from a light source in the form of a surface light source, and allow the light to proceed to the LCD panel 200.

A part of the light emitted from the light guide plate 322 may be emitted to a side opposite to the LCD panel 200 and be lost. The reflective sheet 321 may be positioned below the light guide plate 322 so as to cause the lost light to be incident again on the light guide plate 322, and may be made of a material having a high reflectance.

The diffuser sheet 323 functions to diffuse the light incident from the light guide plate 322. For example, light scattered by the pattern of the light guide plate 322 comes directly into the eyes of the user, and thus, the pattern of the light guide plate 322 may be shown as it is. Moreover, since such a pattern can be clearly sensed even after the LCD panel 200 is mounted, the diffuser sheet 323 is able to perform a function to offset the pattern of the light guide plate 322.

After the light passes through the diffuser sheet 323, the luminance of the light is rapidly reduced. Therefore, the prism sheet 324 may be included in order to improve the luminance of the light by focusing the light again. The prism sheet 324 may include a horizontal prism sheet and a vertical prism sheet.

The backlight unit 300 may include a configuration different from the above-described configuration in accordance with the technical change and development and/or the embodiment. The backlight unit 300 may further include an additional configuration as well as the foregoing configuration. Also, in order to protect the optical configuration of the backlight unit 300 from external impacts and contamination, etc., due to the introduction of the alien substance, the backlight unit 300 according to the embodiment of the present may further include, for example, a protection sheet on the prism sheet 324. The backlight unit 300 may also further include a lamp cover in accordance with the embodiment so as to minimize the optical loss of the light source. The backlight unit 300 may also further include a frame which maintains a shape enabling the light guide plate 322, the diffuser sheet 323, the prism sheet 324, and a lamp (not shown), and the like, which are main components of the backlight unit 300, to be exactly combined together in accordance with an allowed dimension. Also, the each of the configurations may be comprised of at least two separate parts.

According to the embodiment, an additional air gap may be positioned between the light guide plate 322 and the reflective sheet 321. As a result, the lost light from the light guide plate 322 to the reflective sheet 321 can be incident again on the light guide plate 322 by the reflective sheet 321. Here, between the light guide plate 322 and the reflective sheet 321, for the purpose of maintaining the additional air gap, a double adhesive tape (DAT) may be included on the edges of the light guide plate 322 and the reflective sheet 321.

As described above, the backlight unit 300 and the display module including the same may be configured to include in itself the air gap such as the first air gap 310 and/or the second air gap 330. Also, the air gap may be included between a plurality of the layers included in the optical layer 320. In the foregoing, while the case where the LCD panel 200 is employed has been described, the air gap may be included within the structure of another display panel.

Hereafter, in the touch input device 1000 according to the embodiment of the present invention, the principle and structure for detecting the magnitude of touch pressure by using the pressure sensor 450 and 460 will be described in detail.

Figure 5A:
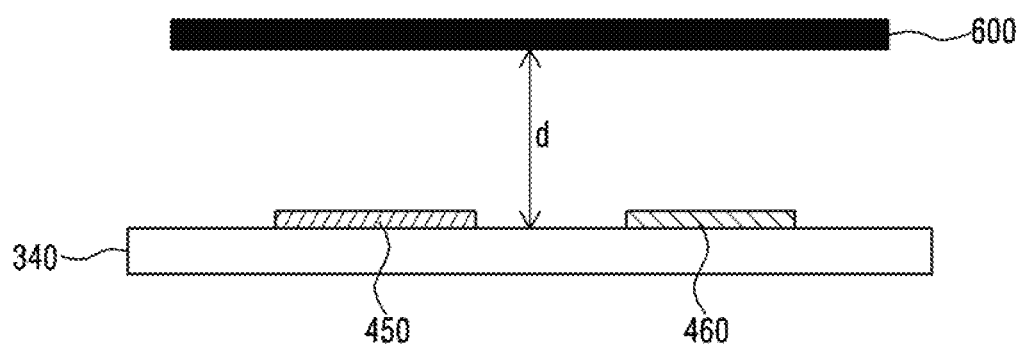
FIG. 5a shows a relative distance between a pressure sensor and a reference potential layer of a first example included in the touch input device shown in FIG. 3.

FIG. 5a shows a relative distance between the pressure sensor and the reference potential layer of a first example included in the touch input device shown in FIG. 3. In the touch input device 1000 according to the embodiment of the present invention, the pressure sensor 450 and 460 may be attached on the cover 340 capable of constituting the backlight unit 300. In the touch input device 1000, the pressure sensor 450 and 460 and the reference potential layer 600 may be spaced apart from each other by a distance "d".

In FIG. 5a, the reference potential layer 600 and the pressure sensor 450 and 460 may be spaced apart from each other with a spacer layer (not shown) placed therebetween. Here, as described with reference to FIGS. 3 and 4, the spacer layer may be the first air gap 310, the second air gap 330, and/or an additional air gap which are included in the manufacture of the display module and/or the backlight unit 300. When the display module and/or the backlight unit 300 includes one air gap, the one air gap is able to perform the function of the spacer layer. When the display module and/or the backlight unit 300 includes a plurality of air gaps, the plurality of air gaps are able to collectively perform the function of the spacer layer.

In the touch input device 1000 according to the embodiment of the present invention, the spacer layer may be located between the reference potential layer 600 and the pressure sensor 450 and 460. As a result, when a pressure is applied to the cover layer 500, the reference potential layer 600 is bent, so that a relative distance between the reference potential layer 600 and the pressure sensor 450 and 460 may be reduced.

In the touch input device 1000 according to the embodiment of the present invention, the display module may be bent or pressed by the touch applying the pressure. The display module may be bent or pressed in such a manner as to show the biggest transformation at the touch position. When the display module is bent or pressed according to the embodiment, a position showing the biggest transformation may not match the touch position. However, the display module may be shown to be bent or pressed at least at the touch position. For example, when the touch position approaches close to the border, edge, etc., of the display module, the most bent or pressed position of the display module may not match the touch position, however, the display module may be shown to be bent or pressed at least at the touch position.

Figure 5B:
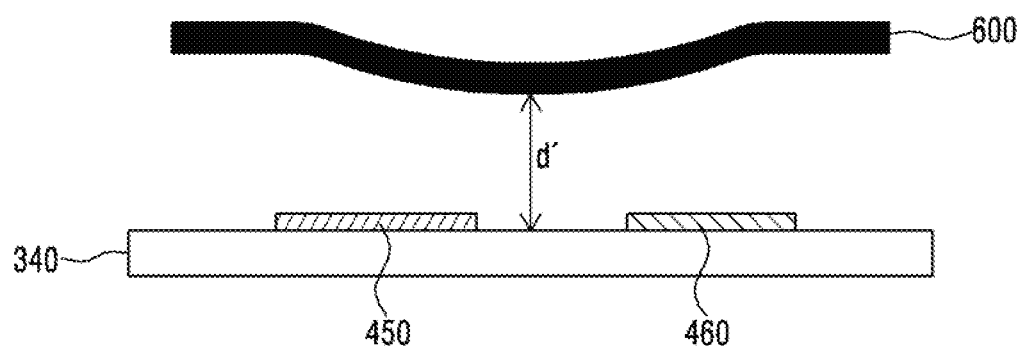

When the cover layer 500, the display module 200, and/or the back light unit 300 are bent or pressed at the time of touching the touch input device 1000 according to the embodiment, the cover 340 positioned below the spacer layer, as shown in FIG. 5b, may be less bent or pressed due to the spacer layer. While FIG. 5b shows that the cover 340 is not bent or pressed at all, this is just an example. The lowest portion of the cover 340 to which the pressure sensor 450 and 460 has been attached may be bent or pressed. However, the degree to which the lowest portion of the cover 340 is bent or pressed can be reduced by the spacer layer.

According to the embodiment, the spacer layer may be implemented in the form of the air gap. The spacer layer may be made of an impact absorbing material in accordance with the embodiment. The spacer layer may be filled with a dielectric material in accordance with the embodiment.

FIG. 5b shows that a pressure is applied to the structure of FIG. 5a. For example, when the external pressure is applied to the cover layer 500 shown in FIG. 3, it can be seen that a relative distance between the reference potential layer 600 and the pressure sensor 450 and 460 is reduced from "d" to "d'". Accordingly, in the touch input device 1000 according to the embodiment, when the external pressure is applied, the reference potential layer 600 is configured to be more bent than the cover 340 to which the pressure sensor 450 and 460 has been attached, so that it is possible to detect the magnitude of touch pressure.

FIGS. 3, 5a, and 5b show that a first electrode 450 and a second electrode 460 are included as the pressure sensor 450 and 460 for detecting the pressure. Here, the mutual capacitance may be generated between the first electrode 450 and the second electrode 460. Here, any one of the first and the second electrodes 450 and 460 may be a drive electrode and the other may be a receiving electrode. A driving signal is applied to the drive electrode, and a sensing signal may be obtained through the receiving electrode. When voltage is applied, the mutual capacitance may be generated between the first electrode 450 and the second electrode 460.

The reference potential layer 600 have any potential which causes the change of the mutual capacitance generated between the first electrode 450 and the second electrode 460. For instance, the reference potential layer 600 may be a ground layer having a ground potential. The reference potential layer 600 may be any ground layer which is included in the display module. According to the embodiment, the reference potential layer 600 may be a ground potential layer which is included in itself during the manufacture of the touch input device 1000. For example, in the display panel 200 shown in FIGS. 2a to 2c, an electrode (not shown) for blocking noise may be included between the first polarizer layer 271 and the first glass layer 261. This electrode for blocking the noise may be composed of ITO and may function as the ground. Also, according to the embodiment, a plurality of the common electrodes included in the display panel 200 constitutes the reference potential layer 600. Here, the potential of the common electrode may be a reference potential.

When a pressure is applied to the cover layer 500 by means of an object, at least a portion of the display panel 200 and/or the backlight unit 300 is bent, so that a relative distance between the reference potential layer 600 and the first and second electrodes 450 and 460 may be reduced from "d" to "d'". Here, the less the distance between the reference potential layer 600 and the first and second electrodes 450 and 460 is, the less the value of the mutual capacitance between the first electrode 450 and the second electrode 460 may be. This is because the distance between the reference potential layer 600 and the first and second electrodes 450 and 460 is reduced from "d" to "d'", so that a fringing capacitance of the mutual capacitance is absorbed in the reference potential layer 600 as well as in the object. When a nonconductive object touches, the change of the mutual capacitance is simply caused by only the change of the distance "d-d'" between the reference potential layer 600 and the electrodes 450 and 460.

FIGS. 3, 5a, and 5b show that the first electrode 450 and the second electrode 460 are formed as the pressure sensors 450 and 460 in the same layer. However, it can be considered that the first electrode 450 and the second electrode 460 are formed in different layers in accordance with a process or the embodiment. A case where the first electrode 450 and the second electrode 460 are formed in different layers will be described in detail with reference to FIG. 7b.

The foregoing has described that the first electrode 450 and the second electrode 460 are included as the pressure sensor 450 and 460, and the pressure is detected by the change of the mutual capacitance between the first electrode 450 and the second electrode 460. The pressure sensor 450 and 460 may be configured to include only any one of the first electrode 450 and the second electrode 460 (for example, the first electrode 450).

Figure 5C:
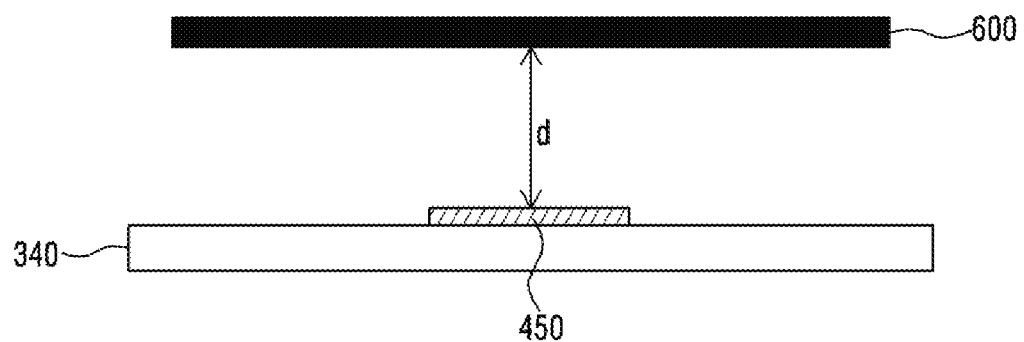
FIG. 5c shows a relative distance between a pressure sensor and a reference potential layer of a second example included in the touch input device shown in FIG. 3.
Figure 5D:
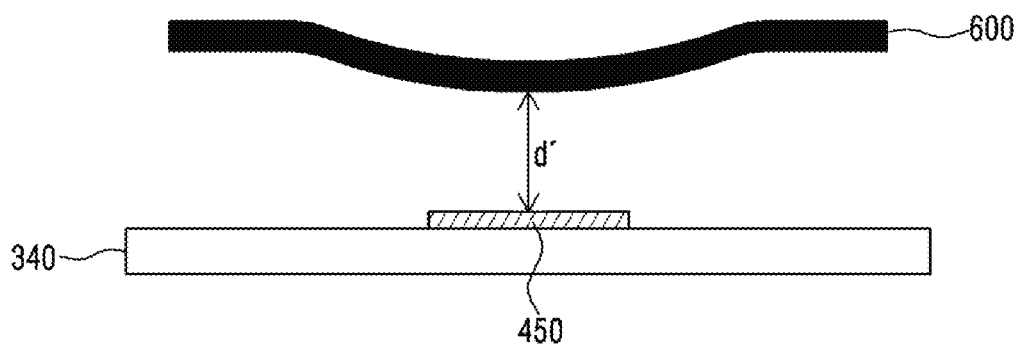
FIG. 5d shows a case where a pressure has been applied in the structure of FIG. 5c.

FIG. 5c shows a relative distance between the pressure sensor and the reference potential layer of a second example included in the touch input device shown in FIG. 3. FIG. 5d shows that a pressure is applied to the structure of FIG. 5c. Here, it is possible to detect the magnitude of touch pressure by detecting the self-capacitance between the first electrode 450 and the reference potential layer 600. Here, the change of the self-capacitance between the first electrode 450 and the reference potential layer 600 is detected by applying the driving signal to the first electrode 450 and by receiving the reception signal from the first electrode 450, so that the magnitude of the touch pressure is detected.

For example, the magnitude of the touch pressure can be detected by the change of the capacitance between the first electrode 450 and the reference potential layer 600, which is caused by the distance change between the reference potential layer 600 and the first electrode 450. Since the distance "d" is reduced with the increase of the touch pressure, the capacitance between the reference potential layer 600 and the first electrode 450 may be increased with the increase of the touch pressure.

According to the embodiment, when the magnitude of the touch pressure is sufficiently large, a state may be created in which the distance between the reference potential layer 600 and the pressure sensors 450 and 460 is not reduced any more at a predetermined position. Hereafter, this state will be referred to as a saturation state. However, even in this case, when the magnitude of the touch pressure becomes larger, an area in the saturation state where the distance between the reference potential layer 600 and the pressure sensors 450 and 460 is not reduced any more may become greater. The greater the area is, the more the mutual capacitance between the first electrode 450 and the second electrode 460 may be reduced. Hereafter, it will be described that the magnitude of the touch pressure is calculated by the change of the capacitance according to the distance change. However, this may include that the size of the touch pressure is calculated by the change of the area in the saturation state.

FIGS. 3 and 5a to 5d show that the first electrode 450 and/or the second electrode 460 are relatively thick and they are directly attached to the cover 340. However, this is just only for convenience of description. In accordance with the embodiment, the first electrode 450 and/or the second electrode 460 may be, for example, attached to the cover 340 in the form of a sheet and may have a relatively small thickness.

FIGS. 6a to 6e show patterns according to a first to fifth examples of an electrode constituting the pressure sensor according to the embodiment of the present invention.

Figure 6A:
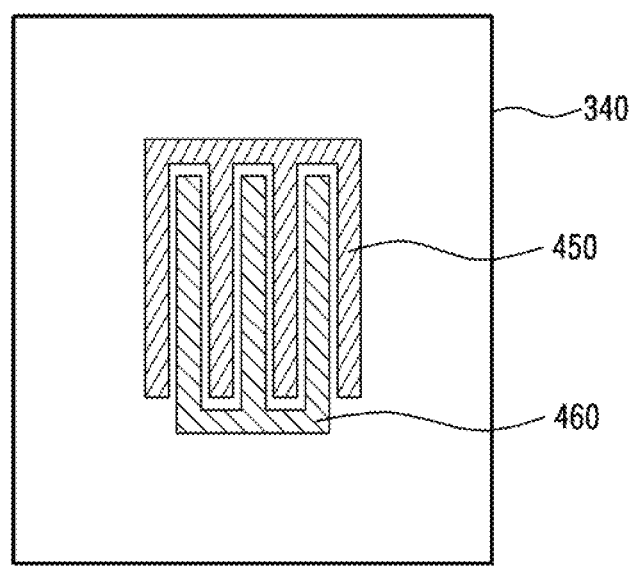
FIGS. 6a to 6e show patterns according to a first to fifth examples of an electrode constituting the pressure sensor according to the embodiment of the present invention.

FIG. 6a shows that a pattern according to the first example of the pressure electrode when the touch pressure is detected through the change of the mutual capacitance between the first electrode 450 and the second electrode 460. When the magnitude of the touch pressure is detected as the mutual capacitance between the first electrode 450 and the second electrode 460 is changed, it is necessary to form the patterns of the first electrode 450 and the second electrode 460 so as to generate the range of the capacitance required to improve the detection accuracy. With the increase of a facing area or facing length of the first electrode 450 and the second electrode 460, the magnitude of the capacitance that is generated may become larger. Therefore, the pattern can be designed by adjusting the size of the facing area, facing length and facing shape of the first electrode 450 and the second electrode 460 in accordance with the range of the necessary capacitance. FIG. 6a shows a pressure electrode pattern having a comb teeth shape such that the facing length of the first electrode 450 and the second electrode 460 becomes longer.

Figure 6B:
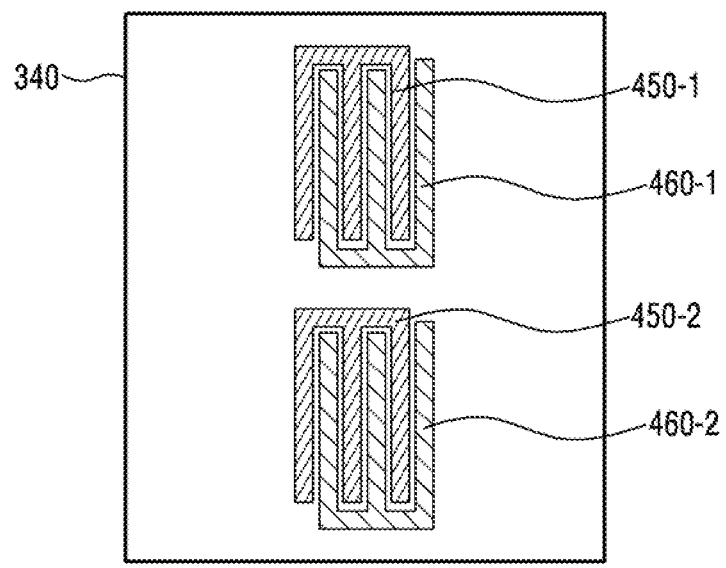
Figure 6C:
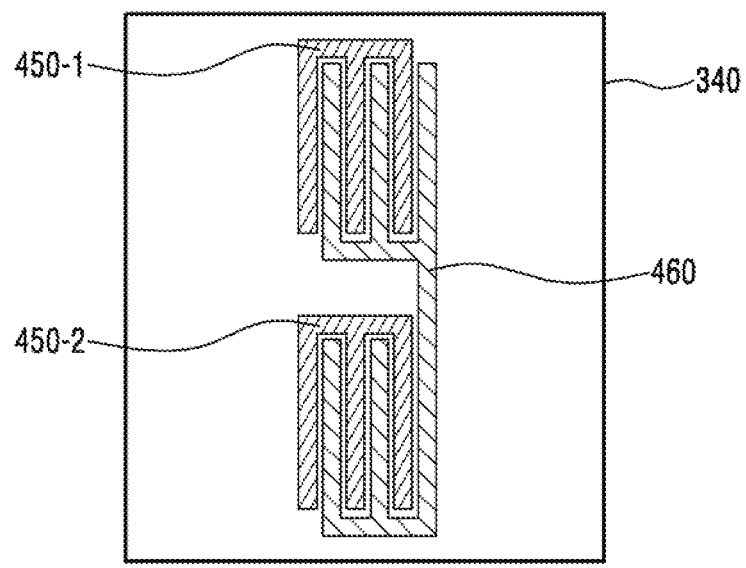

FIG. 6a shows that the first electrode 450 and the second electrode 460 constitutes one channel for detecting the pressure. FIG. 6b shows a pattern when the pressure sensor constitutes two channels. FIG. 6b shows the first electrode 450-1 and the second electrode 460-1 which constitute a first channel, and the first electrode 450-2 and the second electrode 460-2 which constitute a second channel FIG. 6c shows that the first electrode 450 constitutes two channels 450-1 and 450-2, and the second electrode 460 constitutes one channel. Since the pressure sensor detects the magnitude of the touch pressure at different positions through the first channel and the second channel, even when a multi touch occurs, the magnitude of each touch pressure can be detected. Here, in accordance with the embodiment, the pressure sensor 450 and 460 may be configured to constitute a larger number of channels.

Figure 6D:
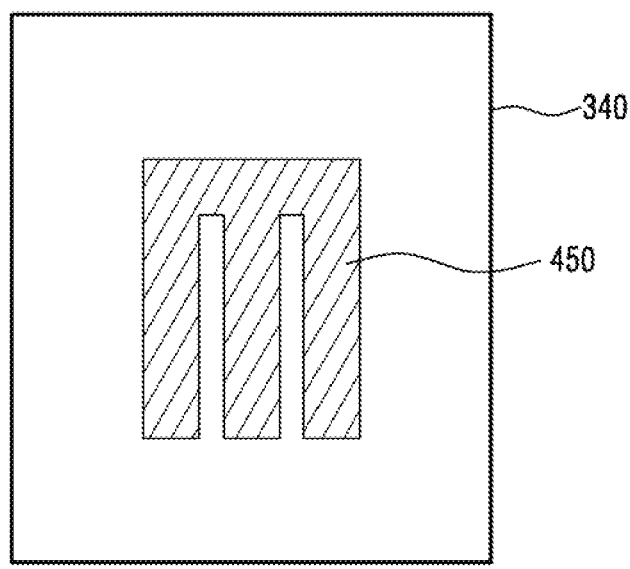

FIG. 6d shows an electrode pattern when the magnitude of the touch pressure is detected according to the change of the self-capacitance between the reference potential layer 600 and the first electrode 450. Although FIG. 6d shows a pattern having a comb teeth shape as the first electrode 450, the first electrode 450 may have a plate shape (for example, a quadrangular plate shape).

Figure 6E:
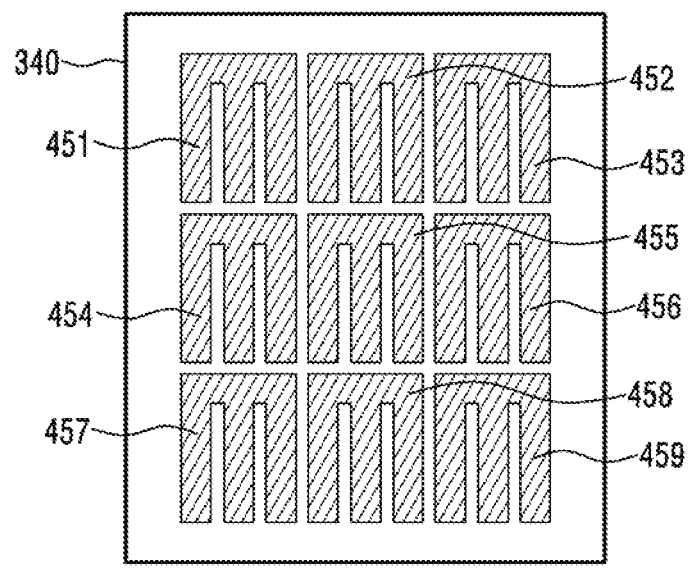

FIG. 6e shows that the first electrodes 451 to 459 constitute nine channels. That is, FIG. 6d shows that one channel is constituted, and FIG. 6e shows a pressure sensor when nine channels are constituted. Therefore, in FIG. 6e, even when a multi touch occurs, the magnitude of each touch pressure can be detected. Here, the pressure sensor can be configured to constitute another number of the channels.

Figure 7:
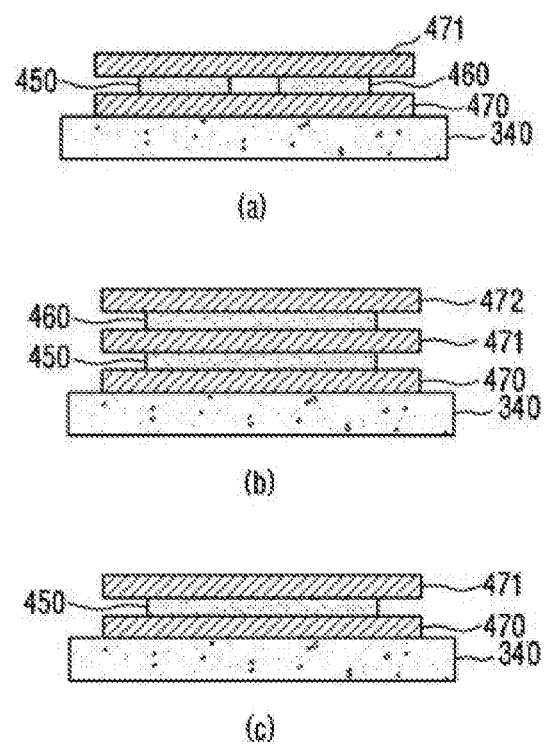
FIG. 7 shows an attachment structure of the pressure sensor according to the embodiment of the present invention.

FIG. 7 shows an attachment structure of the pressure sensor according to the embodiment of the present invention. The pressure sensor 450 and 460 may be attached to the cover 340 by means of an adhesive material like a doublesided contact tape (DAT), an optically clear adhesive (OCA), and an optical clear resin (OCR), etc. Here, the pressure sensor 450 and 460 may be fully laminated on the cover 340.

As shown in FIG. 7a, in order to prevent the cover 340 and the pressure sensor 450 and 460 from being short-circuited, the pressure sensor 450 and 460 may be formed on an insulating layer 470. Describing with reference to FIG. 7a, the pressure sensor 450 and 460 may be disposed on the cover 340 to have the first insulating layer 470 placed therebetween. In accordance with the embodiment, the first insulating layer 470 on which the pressure sensor 450 and 460 has been formed may be attached on the cover 340. Also, in accordance with the embodiment, the pressure sensor may be formed by positioning a mask, which has a through-hole corresponding to the pressure electrode pattern, on the first insulating layer 470, and then by spraying a conductive material. As shown in FIG. 7a, the pressure sensor 450 and 460 may be covered with an additional second insulating layer 471. Also, in accordance with the embodiment, the pressure electrode 450 and 460 formed on the first insulating layer 470 is covered with the additional second insulating layer 471, and then are integrally attached on the cover 340. Also, in accordance with the embodiment, the first insulating layer 470 in itself may be made of an adhesive material.

Also, depending on the kind and/or implementation method of the touch input device 1000, the cover 340 on which the pressure sensor 450 and 460 is attached may not have the ground potential or may have a weak ground potential. In this case, the touch input device 1000 according to the embodiment of the present may further include a ground electrode (not shown) between the cover 340 and the first insulation layer 470. According to the embodiment, another insulation layer (not shown) may be included between the ground electrode and the cover 340. Here, the ground electrode (not shown) is able to prevent the magnitude of the capacitance generated between the first electrode 450 and the second electrode 460, which are pressure sensors, from increasing excessively.

In the foregoing, the first and second embodiments show that the first electrode 450 and the second electrode 460 are formed in the same layer. However, it can be considered that the first electrode 450 and the second electrode 460 are formed in different layers in accordance with the embodiment. It is shown in (b) of FIG. 7 that an attachment structure in which the first electrode 450 and the second electrode 460 are formed in different layers. As shown in (b) of FIG. 7, the first electrode 450 may be formed on the first insulation layer 470, and the second electrode 460 may be formed on the second insulation layer 471 positioned on the first electrode 450. According to the embodiment, the second electrode 460 may be covered with a third insulation layer 472. Here, since the first electrode 450 and the second electrode 460 are disposed in different layers, they can be implemented so as to overlap each other. For example, the first electrode 450 and the second electrode 460 may be formed similarly to the pattern of the drive electrode TX and receiving electrode RX which are arranged in the form of M×N array and are included in the touch sensor panel 100 described with reference to FIG. 1. Here, M and N may be natural numbers greater than 1.

It is shown in (c) of FIG. 7 that an attachment structure in which the pressure electrode is formed to include only the first electrode 450. As shown in (c) of FIG. 7, the first electrode 450 may be formed on the cover 340 to have the first insulation layer 470 placed therebetween. Also, according to the embodiment, the first electrode 450 may be covered with the second insulation layer 471.

In FIGS. 7a to 7c, the case where the pressure sensor constitutes one channel has been described. However, the description of FIGS. 7a to 7c can be applied to a case where the pressure sensor constitutes a plurality of the channels.

In accordance with the embodiment, the pressure sensor 450 and 460 is disposed between the insulating layer 470, 471, and 472, and may be attached to the cover 340 integrally with the insulating layer in the form of an electrode sheet.

In the touch input device 1000 according to the embodiment of the present invention, the touch pressure can be detected by using the air gap and/or potential layer which are positioned within the display panel 200 and/or the backlight unit 300 without manufacturing a separate spacer layer and/or reference potential layer.

Also, in the touch input device 1000 according to the embodiment of the present invention, the pressure sensor 450 and 460 and the air gap 420 for detecting the pressure are disposed behind the display panel 200. Accordingly, the color clarity, visibility, and optical transmittance of the display panel can be improved.

Although embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:

1. A smartphone comprising:
a first cover layer;
an LCD panel which is located under the first cover layer and comprises a liquid crystal layer, and a first glass layer and a second glass layer between which the liquid crystal layer is placed;
a backlight unit which is located under the LCD panel and comprises an optical film, a light source, a reflective sheet and a second cover layer; and
a touch sensor which senses touch in a capacitive manner,
wherein the backlight unit further comprises a pressure sensor and a spacer layer, the pressure sensor comprising a plurality of electrodes formed in a single layer attached on the second cover layer and spaced apart from the reflective sheet, between the reflective sheet and the second cover layer,
wherein a driving signal is applied to the touch sensor and a touch position is detected by a sensing signal which is output from the touch sensor,
wherein a magnitude of a touch pressure is detected based on a change amount of capacitance which is output from the pressure sensor and which is changed according to a distance between the pressure sensor and an electrode located within the LCD panel,
wherein the LCD panel is bent according to the touch, and wherein the change amount of the capacitance output from the pressure sensor changes as the LCD panel bends.

2. The smartphone of claim 1, wherein the electrode located within the LCD panel is composed of indium tin oxide (ITO).

3. The smartphone of claim 2, wherein the touch sensor comprises a plurality of drive electrodes and a plurality of receiving electrodes and at least one of the drive electrodes and the receiving electrodes of the touch sensor are located between the first glass layer and the second glass layer.

4. The smartphone of claim 2,
wherein the LCD panel further comprises a first polarizer layer and a second polarizer layer between which the first glass layer, the liquid crystal layer and the second glass layer are placed,
and wherein the touch sensor is partially located between the first glass layer and the first polarizer layer.

5. The smartphone of claim 2, further comprising an air gap between the LCD panel and the optical film.

6. The smartphone of claim 2, wherein the plurality of electrodes constituting a plurality of channels.

7. The smartphone of claim 1, wherein the electrode located within the LCD panel is a common electrode within the LCD panel.

8. The smartphone of claim 7, wherein the touch sensor comprises a plurality of drive electrodes and a plurality of receiving electrodes and at least one of the drive electrodes and the receiving electrodes of the touch sensor are located between the first glass layer and the second glass layer.

9. The smartphone of claim 7,
wherein the LCD panel further comprises a first polarizer layer and a second polarizer layer between which the first glass layer, the liquid crystal layer and the second glass layer are placed,
and wherein the touch sensor is partially located between the first glass layer and the first polarizer layer.

10. The smartphone of claim 7, further comprising an air gap between the LCD panel and the optical film.

11. The smartphone of claim 7, wherein the plurality of electrodes constitute a plurality of channels.

12. The smartphone of claim 1, wherein the touch sensor comprises a plurality of drive electrodes and a plurality of receiving electrodes and at least one of the drive electrodes and the receiving electrodes of the touch sensor are located between the first glass layer and the second glass layer.

13. The smartphone of claim 1,
wherein the LCD panel further comprises a first polarizer layer and a second polarizer layer between which the first glass layer, the liquid crystal layer and the second glass layer are placed,
and wherein the touch sensor is partially located between the first glass layer and the first polarizer layer.

14. The smartphone of claim 1, further comprising an air gap between the LCD panel and the optical film.

15. The smartphone of claim 1, wherein the plurality of electrodes constitute a plurality of channels.

* * * * *